United States Patent
Avery et al.

(10) Patent No.: US 6,530,316 B2
(45) Date of Patent: Mar. 11, 2003

(54) CONTINUOUSLY OPERATING PRESS UTILIZING A PHENYL-ENDBLOCKED POLYDIORGANOSILOXANE-POLYPHENYLORGANOSILOXANE RANDOM COPOLYMER FLUID

(75) Inventors: Ragnar Richard Avery, Midland, MI (US); Gary Thomas Burns, Belgium (FR); John Joseph Kennan, Midland, MI (US); Michael Robert Reiter, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 102 days.

(21) Appl. No.: 09/760,692

(22) Filed: Jan. 16, 2001

(65) Prior Publication Data

US 2002/0129718 A1 Sep. 19, 2002

(51) Int. Cl.[7] .............................. B30B 15/34; B30B 5/04
(52) U.S. Cl. ....................... 100/306; 100/154; 100/151; 425/101; 425/371
(58) Field of Search ................................ 100/151, 154, 100/306; 425/101, 371; 556/401; 508/208

(56) References Cited

U.S. PATENT DOCUMENTS

| | | | |
|---|---|---|---|
| 2,445,567 A | 7/1948 | Elliott | 260/448.2 |
| 2,468,869 A | 5/1949 | Daudt | 260/448.2 |
| 2,739,952 A | 3/1956 | Linville | 260/30.6 |
| 2,883,366 A | 4/1959 | Kantor et al. | 260/46.5 |
| 3,009,877 A | 11/1961 | Nielsen | 252/37.2 |
| 3,235,495 A | 2/1966 | Buehler | 252/34.7 |
| 3,267,036 A | 8/1966 | Baker et al. | 252/49.7 |
| 3,317,429 A | 5/1967 | Cekada et al. | 252/78 |
| 3,350,309 A | 10/1967 | Buehler | 252/37.2 |
| 4,347,336 A * | 8/1982 | Homan | 427/387 |
| 4,420,299 A | 12/1983 | De Mets | 425/101 |
| 4,565,509 A | 1/1986 | De Mets | 425/101 |
| 4,898,956 A | 2/1990 | Hilty | 556/401 |
| 5,229,139 A | 7/1993 | Haupt | 425/107 |
| 5,599,778 A * | 2/1997 | Ishikawa et al. | 508/208 |
| 6,013,701 A * | 1/2000 | Kunimatsu et al. | 264/211 |

FOREIGN PATENT DOCUMENTS

GB 870007 7/1961

OTHER PUBLICATIONS

Industrial and Engineering Chemistry, "Thermal and Oxidation Stability of Polymethylphenylsiloxanes", Murphy, Saunders, and Smith. vol. 42, No. 12, pp. 2462–2468.

Hetero–Organic Compounds, "Resistance to Thermal Oxidation of Polymethylphenyl–siloxanes Having Different End Groups", Sobolevskii, Nazarova, Chistyakova and Kirillina. pp. 12–14.

U.S. Naval Research Laboratory, "The Stabilization of Silicone Lubricating Liquids Above 200 degrees C Part 2—Iron, Copper, Cerium, and Other Metal Compounds" Backer and Singleterry, Surface Chemistry Branch, Chemistry Division. Aug. 12, 1960. Report 5474, pp. 1–25.

* cited by examiner

Primary Examiner—Allen Ostrager
Assistant Examiner—Jimmy T Nguyen
(74) Attorney, Agent, or Firm—Timothy J. Troy; Patricia M. Scaduto

(57) ABSTRACT

In a first embodiment, this invention relates to a continuously operating press, preferably for the manufacture and/or printing, lamination or the like of a one or multiple layer board web of pre-manufactured material and/or raw material, wherein the lubricant used in the press is at least one phenyl-endblocked polydiorganosiloxane-polyphenylorganosiloxane random copolymer fluid. In a second embodiment, this invention relates to a continuously operating press, preferably for the manufacture and/or printing, lamination or the like of a one or multiple layer board web of pre-manufactured material and/or raw material, wherein the lubricant used in the press is a composition comprising (i) at least one phenyl-endblocked polydiorganosiloxane-polyphenylorganosiloxane random copolymer fluid and (ii) at least one stabilizing agent.

20 Claims, 1 Drawing Sheet

CONTINUOUSLY OPERATING PRESS UTILIZING A PHENYL-ENDBLOCKED POLYDIORGANOSILOXANE-POLYPHENYLORGANOSILOXANE RANDOM COPOLYMER FLUID

FIELD OF THE INVENTION

This invention relates to a continuously operating press, preferably for the manufacture and/or printing, lamination or the like of a one or multiple layer board web of pre-manufactured material and/or raw material. Such presses are particularly used for the manufacture of particleboard, fiberboard, hardboard or the like, and indeed from a mat comprising particles containing lignocellulose and/or cellulose such as wood chips, wood fibers or the like and at least one dispersed binder.

BACKGROUND OF THE INVENTION

Continuously operating presses are known in the art. For example U.S. Pat. No. 4,420,299 discloses a continuous operation press for manufacturing and/or coating, veneering, etc., a single-layer or a multiple-layer board web made of a mat which includes wood chips, wood fibers, etc. The press includes a carrying run of an upper belt which continuously circulates at a preset constant speed and a carrying run of a lower belt, with both belts preferably being made of steel. A friction reducing arrangement such as a slide or friction reducing coating extends over an entire width of a press area and is disposed on an upper and lower abutment, with the entering belts sliding over the friction reducing coating. A pressurized liquid lubricant is supplied to the friction reducing coating. The friction reducing coating extends over at least a main press area as well as a calibration area in which upper and lower slide coating extend parallel to one another. A friction reducing coating may also be provided in the pre-press area with the respective friction reducing coatings being bent or inclined so as to form a press gap. The lubricant is fed to the friction reducing surface of the friction reducing coating through openings formed in the friction reducing coating, with the openings not extending as far as the lateral edge of the friction reducing coating but being spaced therefrom.

U.S. Pat. No. 4,565,509 discloses a continuous operation press for the manufacture and treatment of a board web of prefabricated or raw material, wherein the board web is passed into an inlet region between the upper and lower stringers of upper and lower endless belts traveling at a predetermined velocity in the transport direction, wherein there is provided a smooth coating formed with grooves serving as a sliding surface located at least in the main press and calibration regions. The board web glides above the smooth coating with the aid of fluid lubricant, the lubricant being supplied to the smooth coating through supply openings and discharged therefrom through discharge openings. Each groove in the smooth coating is formed with an opening therein either as a supply or discharge opening, each groove having a lubricant supply opening being positioned adjacent a groove having a lubricant discharge opening. Means are provided for controlling the pressure in at least some of said grooves for generation of a counter-pressure.

In the press disclosed in U.S. Pat. No. 4,565,509 the pressure control means for a lubricant for generating a counter-pressure in the working gap of the press (which pressure control means are associated with each groove of the slide coating having a discharge opening or a supply opening), ensure that the surface forces acting on the press band and on the slide coating are more uniformly carried by the lubricant. This results in an extremely low coefficient of friction and a correspondingly uniform heating or cooling distribution of the lubricant which is an important factor in determining the quality of the pressed material. A further determining factor for the quality is moreover the maintenance of a constant thickness and speed of the lubricant pressure film. This requirement cannot be straightforwardly and sufficiently satisfied in practice for the most stringent demands, even when the pressure control means for the lubricant are ideally adjusted for the generation of a counter-pressure in the working gap of the press.

U.S. Pat. No. 4,850,848 discloses a continuously operating press in which endless bands are moved with constant speed around an upper and a lower press platen and a lubricant film is formed between the confronting press platen surfaces and the respectively associated endless band. The fluid which serves for the build up of the lubricant film is kept in this arrangement under a predeterminable hydrodynamic pressure in at least one press zone at the input side of the press, while a calibration zone is provided at the output side of the press in which the lubricant stands substantially only under static pressure.

U.S. Pat. No. 5,229,139 discloses a continuously operating press for pressing a mat by running the mat in a transport direction through the press, the mat having a width and a narrow edge surface parallel to the transport direction, the press comprising a lower endless press band having a mat supporting side and a lubricated side opposite the mat supporting side; an upper endless press band lying above the lower endless press band positioned so that the mat is pressed between the bands; a slide coating positioned adjacent the lubricated side and having a plurality of grooves positioned in an edge region of the slide coating and extending generally in the transport direction, the edge region being located lateral of the narrow edge surface of the mat when the mat is supported on the lower endless band; and a perpendicular groove oriented generally transverse to the transport direction and extending to a lateral edge of the slide coating to thereby expose the perpendicular groove to outside pressure for reducing the pressure of the lubricant in the edge region.

However, none of the continuously operating presses cited above teach or suggest that a phenyl-endblocked polydiorganosiloxane-polyphenylorganosiloxane random copolymer fluid can be used as the lubricant in the press.

Phenyl-containing siloxanes and their use as lubricants have been disclosed in the art. For example, in U.S. Pat. No. 4,898,956 discloses thermo-oxidatively stable polysiloxanes are prepared by adding certain zirconium compounds to the fluid. These zirconium compounds are of the organozirconium or siloxyzirconium types. Two methods for preparation of the fluids is discussed. The fluids of this invention are useful as heat transfer fluids, lubricants, or damping fluids. They have particular usefulness in applications that have a low surface area to volume ratio.

Sobolevskii et al. on pages 12–14 of the journal Plasticheskie Massy (1962) disclose the resistance to thermal oxidation of polymethylphenylsiloxanes having different endgroups.

U.S. Pat. No. 3,267,036 discloses a method of stabilizing a liquid polysiloxane of the group consisting of liquid methyl-methylphenylmethylchlorophenyl- and methylphenyl chlorophenyl polysiloxanes which comprises combining a liquid polysiloxane of the aforesaid group with a cerium methylhydrogen polysiloxane adduct prepared by a method comprising preparing a solution in benzene of the disproportionation products of cerous acetylacetonate monohydrate by heating from about 3 to 8 moles of said monohydrate in solution in an excess of benzene under reflux and bubbling of air there into until the resulting benzene solution is wine red in color, combining said resulting benzene solution of disproportionation products with a benzene solution of a methylhydrogen polysiloxane having from about 0.5 to 1.67% by weight of silane hydrogen and in proportions to yield a resultant benzene solution which contains about 3 to 8 atoms of cerium per mole of said methylhydrogen polysiloxane, and heating said resulting benzene solution under reflux for about one hour while bubbling air there into at a rate sufficient to maintain the cerium in the ceric state, which is in solution in a portion of the same liquid polysiloxane in proportions to form a fluid mixture which contains from about 0.01 to 0.05% by weight of cerium atoms, rapidly heating said fluid mixture to a temperature in the range of 270 to 280° C. while bubbling air there into at a rate sufficient to maintain the cerium in the ceric state and oxidize silane hydrogen therein, and continuing the heating at said temperature and the bubbling of air there into until the resulting fluid is clear and free from silane hydrogen.

Commercial lubricants currently used in continuously operating presses typically contain a trimethylsiloxy-endblocked polydimethylsiloxane-polyphenylmethylsiloxane random copolymer fluid and a stabilizing additive such as an iron compound. These lubricants have superior longevity versus prior lubricants, but still degrade with time and conditions of use (such as high temperatures and exposure to oxygen and contaminants). This degradation takes the form of an increase in fluid viscosity and a loss of fluid volume (in practice, volume loss is a combination of fluid breakdown and subsequent evaporation of some of the breakdown products plus system losses due to filter changes, system leaks, etc.), requiring make-up fluid addition and eventually partial or full fluid change-out. However, there has been no disclosure of the use of a phenyl-endblocked polydiorganosiloxane-polyphenylorganosiloxane random copolymer fluid as a lubricant for use as in a continuously operating press.

SUMMARY OF THE INVENTION

In a first embodiment, this invention relates to a continuously operating press, preferably for the manufacture and/or printing, lamination or the like of a one or multiple layer board web of pre-manufactured material and/or raw material, the improvement comprising using as the lubricant a phenyl-endblocked polydiorganosiloxane-polyphenylorganosiloxane random copolymer fluid.

In a second embodiment, this invention relates to a continuously operating press, preferably for the manufacture and/or printing, lamination or the like of a one or multiple layer board web of pre-manufactured material and/or raw material, the improvement comprising using as the lubricant a composition comprising (i) a phenyl-endblocked polydiorganosiloxane-polyphenylorganosiloxane random copolymer fluid and (ii) at least one stabilizing agent.

BRIEF DESCRIPTION OF THE DRAWING

The description of an embodiment of the invention will follow with respect to the drawings in which are shown.

DETAILED DESCRIPTION OF THE INVENTION

Figure 1:
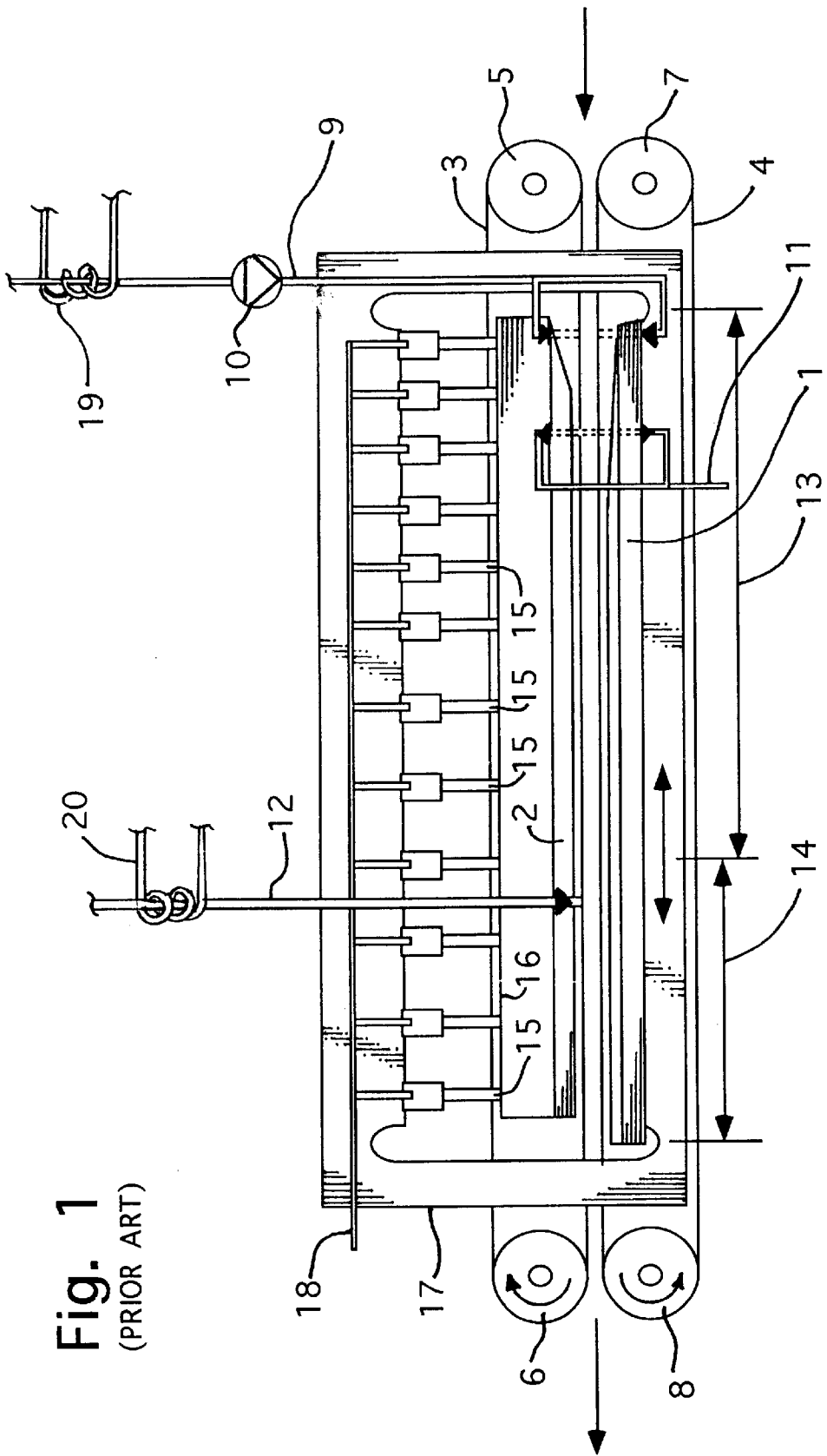
FIG. 1 is a prior art arrangement in the form of the single FIGURE of U.S. Pat. No. 4,850,848.

In a first embodiment, this invention relates to a continuous operation press for the manufacture and treating of a board web comprising prefabricated material or raw material and cellulose-containing particles, the board web being passed into an inlet region of a lower endless steel belt and an upper endless steel belt, which travel at a predetermined velocity in a transport direction, wherein there is provided a smooth coating formed with grooves serving as a sliding surface located at least in the main press region and the calibration region disposed downstream therefrom, the smooth coating is supported on a lower countersupport and on an upper countersupport, the board web gliding above the smooth coating with the aid of fluid lubricant, the supply of said fluid lubricant being under pressure, the lubricant being supplied to the smooth coating through supply conduits and supply openings and discharged therefrom through discharge openings and discharge conduits, the lubricant being recirculated and optionally heated or cooled, the improvement comprising using as the lubricant at least one phenyl-endblocked polydiorganosiloxane-polyphenylorganosiloxane random copolymer fluid selected from the group consisting of phenyldimethylsiloxy-endblocked polydiorganosiloxane-polyphenylorganosiloxane random copolymer fluids, diphenylmethylsiloxy-endblocked polydiorganosiloxane-polyphenylorganosiloxane random copolymer fluids, and triphenylsiloxy-endblocked polydiorganosiloxane-polyphenylorganosiloxane random copolymer fluids.

The phenyl-endblocked polydiorganosiloxane-polyphenylorganosiloxane random copolymer fluids of this invention can be used in any of the known continuously operating presses such as those disclosed in U.S. Pat. Nos. 4,420,299, 4,565,509, 4,565,509, 4,850,848, and 5,229,139 the disclosures of which are incorporated herein by reference.

In this invention, preferably, the prefabricated material or raw material is a non-woven material treated with binding means. It is also preferred that the cellulose-containing particles are wood chips, wood fibers, or a combination thereof.

An embodiment of the invention will now be described with reference to the FIGURE which shows a schematic representation of a continuously operating press in accordance with the invention.

In accordance with the FIGURE, the continuous press includes a stationary press table 1 and a vertically adjustable press platen 2 and also endless steel bands 3, 4 which are guided over deflection rollers 5, 6 and 7, 8 respectively and are moved with the same speed along the confronting surfaces of the press table 1 and the press platen 2. In order to make sliding of the steel bands 3, 4 along the press table (lower press platen 1) and along the upper press platen 2 possible, lubricant (the phenyl-endblocked polydiorganosiloxane-polyphenylorganosiloxane random copolymer fluid of this invention) is supplied to these platens so that a full area slide film is formed. The extraction of the phenyl-endblocked polydiorganosiloxane-polyphenylorganosiloxane random copolymer fluid takes place via suitably provided openings in the press table 1 or in the press platen 2 and also at the edges of the press surfaces.

The supply of phenyl-endblocked polydiorganosiloxane-polyphenylorganosiloxane random copolymer fluid at the input side to the press takes place via at least one schematically illustrated line 9, and indeed under the action of a pump 10 which generates the hydrodynamic pressure required in the press zone 13.

The return of the phenyl-endblocked polydiorganosiloxane-polyphenylorganosiloxane random copolymer fluid from the press zone 13 takes place via a line 11 which is only schematically illustrated, with the phenyl-endblocked polydiorganosiloxane-polyphenylorganosiloxane random copolymer fluid preferably being guided in the circuit, i.e. phenyl-endblocked polydiorganosiloxane-polyphenylorganosiloxane random copolymer fluid drained or extracted via the line 11 is returned to a sump (not shown) and ultimately to the pump 10 which draws phenyl-endblocked polydiorganosiloxane-polyphenylorganosiloxane random copolymer fluid from the sump, usually via a heat exchanger 19 which may be supplied with waste heat, e.g. from the ice making plant referred to earlier. Alternatively the heat exchanger can be positioned in the sump. The entire press zone 13 can be phenyl-endblocked polydiorganosiloxane-polyphenylorganosiloxane random copolymer fluid lubricated in accordance with this hydrodynamic pressure principle.

The calibration zone 14 then adjoins this press zone 13 and, as a double arrow indicates, the size of the press zone 13 and of the calibration zone 14 can be made variable in order to take account of the particular requirements for the product being manufactured.

In the calibration zone 14 the phenyl-endblocked polydiorganosiloxane-polyphenylorganosiloxane random copolymer fluid has essentially only static pressure and the phenyl-endblocked polydiorganosiloxane-polyphenylorganosiloxane random copolymer fluid required for this calibration zone can originate wholly or partly from the press zone 13 and be transferred into the calibration zone 14 in the form of towed fluid, i.e. fluid towed along by the endless bands.

It is however also possible to supply the calibration zone 14 via a conduit 12 with further phenyl-endblocked polydiorganosiloxane-polyphenylorganosiloxane random copolymer fluid, however not a fluid which stands under a hydrodynamic pressure. A second heat exchanger 20 permits heating the hydrostatically provided phenyl-endblocked polydiorganosiloxane-polyphenylorganosiloxane random copolymer fluid in line 12, independently of any heating in the hydrodynamically provided phenyl-endblocked polydiorganosiloxane-polyphenylorganosiloxane random copolymer fluid in line 9 in the press zone 13. The heating of phenyl-endblocked polydiorganosiloxane-polyphenylorganosiloxane random copolymer fluid in line 12 by heat exchanger 20 may be required to minimize local temperature shock.

The provision of press zones which stand under hydrodynamic pressure and optionally under reduced hydrodynamic pressure and a press zone at the output side which stands under hydrostatic pressure also makes it possible to provide differentiated temperature loading of these individual zones by the supply of differentially heated or optionally indeed even cooled phenyl-endblocked polydiorganosiloxane-polyphenylorganosiloxane random copolymer fluid. In this manner one can in turn meet the requirements for the particular product that is to be manufactured in the best possible manner by setting the respective pressure and temperature parameters along the length of the press.

In the drawing the reference numerals 15 show the individual hydraulic rams which are used to provide the actual working pressure of the press, i.e. to press the press platen 2 downwardly towards the fixed press platen 1. As can be seen the hydraulic rams 15 bear at their lower ends against a force transmitting rail 16 provided on and above the press platen 2 and with their other ends against a frame 17 which surrounds the two press platens 1 and 2. In practice a frame such as 17 is also provided on the other side of the endless bands, i.e. behind the frame 17 shown in the plane of the drawing and further rams are interposed between this further frame and a further rail member 16 on the platen 2. Hydraulic pressure is supplied to the rams via the duct 18. The duct 12 with the supplied phenyl-endblocked polydiorganosiloxane-polyphenylorganosiloxane random copolymer fluid under only static pressure can communicate directly with a body of phenyl-endblocked polydiorganosiloxane-polyphenylorganosiloxane random copolymer fluid held in a container with the level of the fluid in the container being kept constant by a float system, in similar manner to the float system of a carburetor or oil stove so that a steady static head of pressure is present in the line 12 and thus in the press zone 14.

Although in U.S. Pat. No. 4,850,848 (from which the description of FIG. 1 is taken) consciously avoids dynamic pressure in the calibration zone 14 it is within the scope of the present invention to provide either only static pressure phenyl-endblocked polydiorganosiloxane-polyphenylorganosiloxane random copolymer fluid in the calibration zone (as in U.S. Pat. No. 4,850,848) or alternatively to utilize dynamic pressure there in the same way as in the zone 13.

The phenyl-endblocked polydiorganosiloxane-polyphenylorganosiloxane random copolymer fluid of this invention is now described in greater detail. By "random copolymer" it is meant that either individual diorganosiloxy and phenylorganosiloxy units are distributed randomly within each polymer chain or that short blocks comprising multiple diorganosiloxy units and short blocks comprising multiple phenylorganosiloxy units are distributed randomly within the polymer chain. The organo substituents on the copolymer fluid are exemplified by a monovalent hydrocarbon group having from 1 to 20 carbon atoms exemplified by alkyl groups such as methyl, ethyl, propyl, butyl, hexyl, octyl, and decyl, cycloaliphatic groups such as cyclohexyl, aryl groups such as phenyl, tolyl, and xylyl, and aralkyl groups such as benzyl and phenylethyl. It is especially preferred that the organo substituent is methyl. Typically in the copolymer fluids of this invention, the molar ratio of diorganosiloxane units to phenylorganosiloxane is from 0.2:1 to 20:1. The viscosity at 25° C. of the phenyl-endblocked polydiorganosiloxane-polyphenylorganosiloxane random copolymer fluid is generally from 50 to 10,000 mm$^2$/s, and is preferably from 100 to 3,000 mm$^2$/s (1 mm$^2$/s=1 centistoke). The preferred phenyl-endblocked polydiorganosiloxane-polyphenylorganosiloxane random copolymer fluid of this invention is a diphenylmethylsiloxy-endblocked polydimethylsiloxane-polyphenylmethylsiloxane random copolymer fluid having a molar ratio of dimethylsiloxane units to phenylmethylsiloxane units is from 0.2:1 to 1:1, and a viscosity at 25° C. from 100 to 3,000 mm$^2$/s. The copolymer fluid can be a single copolymer or a combination of two or more different phenyl-endblocked polydimethylsiloxane-polyphenylmethylsiloxane random copolymer fluids.

The copolymers of this invention are produced via batch equilibration of low molecular weight diorganosiloxanes, phenylorganosiloxanes, phenyl-endblocked siloxanes, and, potassium hydroxide to form a random copolymer. The molecular weight and distribution of diorganosiloxy and phenylorganosiloxy units of the random copolymer formed is controlled by the ratio of the reactants fed to the batch equilibrator. After equilibration, the random copolymer of the current invention is neutralized, filtered and then stripped under vacuum for a time sufficient to obtain a minimum closed cup flash point of 287.8° C. Furthermore, polymerization of cyclic and low molecular weight siloxanes to form siloxanes are well know to those skilled in the art such as is disclosed in Great Britain Patent Publication No. 0583875. Those skilled in the art are also aware that great care must be taken to neutralize, decompose, or remove residual polymerization catalysts, as these can have a negative impact on the thermal stability of siloxane fluids such as is disclosed in U.S. Pat. No. 2,883,366.

In a second embodiment, this invention relates to a continuous operation press for the manufacture and treating of a board web comprising prefabricated material or raw material and cellulose-containing particles, the board web being passed into an inlet region of a lower endless steel belt and an upper endless steel belt, which travel at a predetermined velocity in a transport direction, wherein there is provided a smooth coating formed with grooves serving as a sliding surface located at least in the main press region and the calibration region disposed downstream therefrom, the smooth coating is supported on a lower countersupport and on an upper countersupport, the board web gliding above the smooth coating with the aid of fluid lubricant, the supply of said fluid lubricant being under pressure, the lubricant being supplied to the smooth coating through supply conduits and supply openings and discharged therefrom through discharge openings and discharge conduits, the lubricant being recirculated and optionally heated or cooled, the improvement comprising using as the lubricant a composition comprising (i) at least one phenyl-endblocked polydiorganosiloxane-polyphenylorganosiloxane random copolymer fluid selected from the group consisting of phenyldimethylsiloxy-endblocked polydiorganosiloxane-polyphenylorganosiloxane random copolymer fluids, diphenylmethylsiloxy-endblocked polydiorganosiloxane-polyphenylorganosiloxane random copolymer fluids, and triphenylsiloxy-endblocked polydiorganosiloxane-polyphenylorganosiloxane random copolymer fluids and (ii) at least one stabilizing agent.

With regard to the second embodiment of this invention, the continuously operating press and the phenyl-endblocked polydiorganosiloxane-polyphenylorganosiloxane random copolymer fluid, component (i), are as described above including preferred embodiments thereof. Component (ii), the stabilizing agent is exemplified by metal compounds such as iron compounds such as iron 2-ethylhexanoate, iron hexogen octoate, and iron naphthanate, cobalt compounds such as cobalt octoate, nickel compounds, zirconium compounds such as zirconium octoate, cesium compounds, cerium compounds such as cerium naphthanate and cerium soap in the presence of dialicylalpropylenediamine, copper compounds such as copper naphthanate, chromium compounds, barium compounds such as barium octoate, cadmium compounds such as cadmium octoate, indium compounds such as indium octoate, magnesium compounds such as magnesium octoate, tin compounds such as tin octoate, zinc compounds such as zinc octoate, bismuth compounds such as bismuth naphthanate, rare earth metal naphthenates, strontium naphthanate, titanium naphthanate, praseodymium compounds, europium compounds, lanthanum compounds, or combinations of these compounds, and organic compounds such as aromatic amines, phenothiazines and organic selenides. Preferred among these are iron, cobalt, copper, cerium compounds, praseodymium compounds, and europium compounds, with iron compounds being preferred. Component (ii), the stabilizing agent, is present in an amount sufficient to provide from a metal content from 10 to 500 parts per million parts of Component (i), the phenyl-endblocked polydiorganosiloxane-polyphenylorganosiloxane random copolymer fluid, and preferably a metal content in an amount from 50 to 200 parts per million parts of Component (i).

EXAMPLE 1

The performance of a phenyl-endblocked polydimethylsiloxane-polyphenylmethylsiloxane random copolymer fluid, was compared in the laboratory to the current commercial lubricant utilized in continuously operating presses, a trimethylsiloxy-endblocked polydimethylsiloxane-polyphenylmethylsiloxane random copolymer by numerous thermal aging studies. The primary degradation mechanism for the trimethylsiloxy-endblocked polydimethylsiloxane-polyphenylmethylsiloxane random copolymer fluid used both as a heat transfer and hydraulic fluid in continuous particleboard presses is a gradual increase in viscosity over time to the point where it can no longer be efficiently circulated in the press piping system.

The comparison copolymer, Copolymer A (denoted "A" in Table 1 below), a copolymer similar to a commercially available copolymer used in continuously operating presses, was a trimethylsiloxy-endblocked polydimethylsiloxane-polyphenylmethylsiloxane copolymer having a targeted degree of polymerization of 130, and a viscosity at 25° C. of 2400 mm$^2$/s.

The copolymer of the invention, Copolymer B (denoted "B" in Table 1 below) was a diphenylmethylsiloxy-endblocked polydimethylsiloxane-polyphenylmethylsiloxane random copolymer having a targeted degree of polymerization of 127, and a viscosity at 25° C. of 2100 mm$^2$/s.

For the initial laboratory study, prototype materials were prepared in the laboratory and then characterized prior to commencement of thermal aging studies. For the copolymers referenced in Table 1 and Table 2, Copolymer A exhibited a number average molecular weight ($M_n$) of 12,300 and a weight average molecular weight ($M_w$) of 16,200 which resulted in the ratio of $M_w/M_n$ of 1.32. Copolymer B exhibited a number average molecular weight ($M_n$) of 11,700 and a weight average molecular weight ($M_w$) of 15,500 which resulted in the ratio of $M_w/M_n$ of 1.32. Iron 2-ethylhexanoate was blended into portions of each copolymer as an antioxidant to produce copolymers with iron concentrations of 80 and 150 parts per million.

Forty five gram samples of each copolymer were weighed into 53 mm diameter Pyrex® beakers and then, to minimize the impact of any thermal gradients, placed in close proximity to each other in a Despatch® Series V circulating air oven at 320 degrees Celsius for thermal aging. The beakers were removed at the times indicated in Table #1 to collect approximately a 1 gram sample from each beaker for viscosity testing. Viscosities were determined at 25 degrees Celsius on a Carri-Med® Rheometer using a 2 centimeter diameter cone with a 0°30'0" cone angle by ramping the shear stress from 100 to 200,000 dyne/cm$^2$ over a 5 minute test period and then extrapolating to zero shear viscosity. Viscosity results are provided in Table 1:

TABLE 1

Viscosity (in Poise)

| Hours Aged | 0 ppm Iron A | 0 ppm Iron B | 80 ppm Iron A | 80 ppm Iron B | 150 ppm Iron A | 150 ppm Iron B |
|---|---|---|---|---|---|---|
| 0 | 25.9 | 21.9 | 24.3 | 20.2 | 23.4 | 18.6 |
| 1.0 | 23.5 | 27.0 | 23.5 | 25.3 | 21.7 | 24.4 |
| 3.5 | 24.5 | 29.2 | 23.9 | 27.2 | 24.2 | 26.3 |
| 6.5 | 26.4 | 30.5 | 24.2 | 27.0 | 25.2 | 27.3 |
| 10 | 29.1 | 32.3 | 25.0 | 27.1 | 26.6 | 27.4 |
| 14 | 35.1 | 38.5 | 25.7 | 27.2 | 27.7 | 28.3 |
| 19 | 47.0 | 42.5 | 26.7 | 29.0 | 29.3 | 29.3 |
| 25 | 58.5 | 51.8 | 27.2 | 28.3 | 29.6 | 29.0 |
| 33 | Gel | 115 | 28.4 | 28.9 | 30.5 | 29.4 |
| 57 | | Gel | 34.8 | 32.2 | 35.8 | 32.4 |
| 84 | | | 60.4 | 47.3 | 54.0 | 44.2 |
| 147 | | | Gel | 158 | Gel | 102 |
| 168 | | | | 450 | | 146 |
| 192 | | | | Gel | | 350 |
| 210 | | | | | | Gel |

A second study was completed to determine the time required to reach gelation using 8 gram aliquots of each of the six samples referenced in Table 1 and placed in 63 mm diameter aluminum pans in a 320° C. circulating air oven. For this study the samples were considered to be gelled if the material did not flow when the aluminum pan was tilted from side to side. The results from this study are reported in Table 2:

TABLE 2

Gel Time (Days)

| 0 ppm Iron A | 0 ppm Iron B | 80 ppm Iron A | 80 ppm Iron B | 150 ppm Iron A | 150 ppm Iron B |
|---|---|---|---|---|---|
| 0.5 | 0.7 | 16 | 27 | 36 | 58 |

A third laboratory study was conducted to measure the viscosity stability of the current invention compared to that of the current art by aging each material at 280 degrees Celsius in a forced draft oven until the point of gelation. For this particular study, three copolymers of the current invention were produced in the laboratory and characterized via Gel Permeation Chromatography and $Si^{29}$ Nuclear Magnetic Resonance Spectroscopy. Characterization results were:

TABLE 3

Characterization Results for Diphenylmethylsiloxy-Endblocked Copolymers

| Copolymer | $M_n$ | $M_w$ | $M_w/M_n$ | Degree of Polymerization |
|---|---|---|---|---|
| PROD1 | 4,879 | 8,484 | 1.74 | 46 |
| PROD2 | 3,974 | 7,774 | 1.96 | 43 |
| PROD3 | 3,798 | 7,599 | 2.00 | 42 |

Iron Hexogen Octoate was added to each prototype material as an antioxidant such that the iron concentration in the formulation was about 150 ppm.

A comparison sample was prepared by adding Iron Hexogen Octoate as an antioxidant to a trimethylsiloxy-endblocked polydimethylsiloxane-polyphenylmethylsiloxane random copolymer (PROD4), the Iron Hexogen Octoate was added in an amount such that the iron concentration in the formulation was about 150 ppm. The sample was analyzed via $Si^{29}$ Nuclear Magnetic Resonance Spectroscopy to determine the degree of polymerization of the copolymer. The degree of polymerization for this sample was 57.

For this thermal aging study, 200 gram samples of each material were measured into 400 ml Pyrex® beakers and placed in close proximity to each other in a Blue-M® Industrial Batch circulating air oven to minimize the effect of any thermal gradients present in the oven. The beakers were removed at the time intervals noted in Table #4 and allowed to cool to room temperature for a period of approximately four hours and then mixed by hand with a laboratory spatula to ensure a homogeneous sample would be collected for viscosity determination. A ½–¾ gram sample was removed from each beaker for viscosity testing after which the beakers were simultaneously placed back in the oven for continued thermal aging. The viscosity of each sample was measured at 25 degrees Celsius with a Brookfield® Cone & Plate Viscometer using a #CP-52 Spindle.

TABLE 4

| Days Aged | Viscosity (in mPa · s (millipascal-seconds)) | | | |
|---|---|---|---|---|
| | PROD1 | PROD2 | PROD3 | PROD4 |
| 0 | 894.5 | 747.1 | 722.6 | 1135 |
| 5 | 919.1 | 855.2 | 850.3 | 1155 |
| 11 | 968.3 | 889.6 | 889.6 | 1346 |
| 21 | 1243 | 1061 | 1047 | 1917 |
| 28 | 1730 | 1312 | 1376 | 2796 |
| 34 | 2904 | 1803 | 2123 | 4993 |
| 49 | 33,420 | 19,850 | Semi-gelled | Gelled |
| 61 | Gelled | Gelled | Gelled | Gelled |

Referring now to Table 1, it can be seen that the three phenyl-endblocked polydimethylsiloxane-polyphenylmethylsiloxane random copolymers of the present invention exhibited, regardless of the concentration of the iron antioxidant, increased stability as measured by the change in viscosity over time and the time required to reach gelation versus the three trimethylsiloxy-endblocked polydimethylsiloxane-polyphenylmethylsiloxane random copolymers. Table 2 further demonstrates, by measuring the time to gelation, the enhanced performance or stability of the copolymers of the current invention versus current commercial copolymers independent of the iron antioxidant concentration.

Referring to Table 4, it can been seen that the three phenyl-endblocked polydimethylsiloxane-polyphenylmethylsiloxane random copolymers of the present invention (PROD1, PROD2 and, PROD3) exhibited increased viscosity stability as measured by the change in viscosity over time and the time required to reach gelation relative to current commercially available product technology (a trimethylsiloxy-endblocked polydimethylsiloxane-polyphenylmethylsiloxane random copolymer (PROD4).

That which is claimed is:

1. In a continuous operation press for the manufacture and treating of a board web comprising prefabricated material or raw material and cellulose-containing particles, the board web being passed into an inlet region of a lower endless steel belt and an upper endless steel belt, which travel at a predetermined velocity in a transport direction, wherein there is provided a smooth coating formed with grooves serving as a sliding surface located at least in the main press region and the calibration region disposed downstream therefrom, the smooth coating is supported on a lower countersupport and on an upper countersupport, the board web gliding above the smooth coating with the aid of fluid lubricant, the supply of said fluid lubricant being under pressure, the lubricant being supplied to the smooth coating through supply conduits and supply openings and discharged therefrom through discharge openings and discharge conduits, the lubricant being recirculated and optionally heated or cooled, the improvement comprising using as the lubricant at least one phenyl-endblocked polydiorganosiloxane-polyphenylorganosiloxane random copolymer fluid selected from the group consisting of phenyldimethylsiloxy-endblocked polydiorganosiloxane-polyphenylorganosiloxane random copolymer fluids, diphenylmethylsiloxy-endblocked polydiorganosiloxane-polyphenylorganosiloxane random copolymer fluids, and triphenylsiloxy-endblocked polydiorganosiloxane-polyphenylorganosiloxane random copolymer fluids.

2. A press according to claim 1, wherein the prefabricated material or raw material is a non-woven material treated with binding means.

3. A press according to claim 1, wherein the cellulose-containing particles are wood chips, wood fibers, or a combination thereof.

4. A press according to claim 2, wherein the cellulose-containing particles are wood chips, wood fibers, or a combination thereof.

5. A press according to claim 1, wherein the copolymer fluid has a molar ratio of diorganosiloxane units to phenylorganosiloxane units of 0.2:1 to 20:1 and the viscosity at 25° C. of the copolymer fluid is from 50 to 10,000 mm$^2$/s.

6. A press according to claim 1, wherein the copolymer fluid is a diphenylmethylsiloxy-endblocked polydimethylsiloxane-polyphenylmethylsiloxane random copolymer fluid having a viscosity at 25° C. from 100 to 3,000 mm$^2$/s, and wherein the molar ratio of dimethylsiloxane units to phenylmethylsiloxane units is from 0.2:1 to 1:1.

7. A press according to claim 4, wherein the copolymer fluid is a diphenylmethylsiloxy-endblocked polydimethylsiloxane-polyphenylmethylsiloxane random copolymer fluid having a viscosity at 25° C. from 100 to 3,000 mm$^2$/s, and wherein the molar ratio of dimethylsiloxane units to phenylmethylsiloxane segment is from 0.2:1 to 1:1.

8. In a continuous operation press for the manufacture and treating of a board web comprising prefabricated material or raw material and cellulose-containing particles, the board web being passed into an inlet region of a lower endless steel belt and an upper endless steel belt, which travel at a predetermined velocity in a transport direction, wherein there is provided a smooth coating formed with grooves serving as a sliding surface located at least in the main press region and the calibration region disposed downstream therefrom, the smooth coating is supported on a lower countersupport and on an upper countersupport, the board web gliding above the smooth coating with the aid of fluid lubricant, the supply of said fluid lubricant being under pressure, the lubricant being supplied to the smooth coating through supply conduits and supply openings and discharged therefrom through discharge openings and discharge conduits, the lubricant being recirculated and optionally heated or cooled, the improvement comprising using as the lubricant a composition comprising (i) at least one phenyl-endblocked polydiorganosiloxane-polyphenylorganosiloxane random copolymer fluid selected from the group consisting of phenyldimethylsiloxy-endblocked polydiorganosiloxane-polyphenylorganosiloxane random copolymer fluids, diphenylmethylsiloxy-endblocked polydiorganosiloxane-polyphenylorganosiloxane random copolymer fluids, and triphenylsiloxy-endblocked polydiorganosiloxane-polyphenylorganosiloxane random copolymer fluids and (ii) at least one stabilizing agent.

9. A press according to claim 8, wherein the prefabricated material or raw material is a non-woven material treated with binding means.

10. A press according to claim 8, wherein the cellulose-containing particles are wood chips, wood fibers, or a combination thereof.

11. A press according to claim 9, wherein the cellulose-containing particles are wood chips, wood fibers, or a combination thereof.

12. A press according to claim 8, wherein the copolymer fluid has a molar ratio of diorganosiloxane units to phenylorganosiloxane units of 0.2:1 to 20:1 and the viscosity at 25° C. of the copolymer fluid is from 50 to 10,000 mm$^2$/s.

13. A press according to claim 8, wherein the copolymer fluid is a diphenylmethylsiloxy-endblocked polydimethylsiloxane-polyphenylmethylsiloxane random copolymer fluid having a viscosity at 25° C. from 100 to 3,000 mm$^2$/s, and wherein the molar ratio of dimethylsiloxane units to phenylmethylsiloxane units is from 0.2:1 to 1:1.

14. A press according to claim 11, wherein the copolymer fluid is a diphenylmethylsiloxy-endblocked polydimethylsiloxane-polyphenylmethylsiloxane random copolymer fluid having a viscosity at 25° C. from 100 to 3,000 mm$^2$/s, and wherein the molar ratio of dimethylsiloxane units to phenylmethylsiloxane units is from 0.2:1 to 1:1.

15. A press according to claim 8, wherein the stabilizing agent is a metal compound.

16. A press according to claim 15, wherein the metal compound is selected from the group consisting of iron compounds, cobalt compounds, nickel compounds, zirconium compounds, cesium compounds, cerium compounds, copper compounds, chromium compounds, barium compounds, cadmium compounds, indium compounds, magnesium compounds, tin compounds, zinc compounds, bismuth compounds, rare earth metal naphthenates, strontium naphthanate, titanium naphthanate, praseodymium compounds, europium compounds, lanthanum compounds, or a combinations thereof.

17. A press according to claim 16, wherein the metal compound is selected from the group consisting of iron compounds, cobalt compounds, copper compounds, cerium compounds, praseodymium compounds, and europium compounds.

18. A press according to claim 17, wherein the metal compound is an iron compound.

19. A press according to claim 18, wherein the iron compound is iron 2-ethylhexanoate, iron hexogen octoate, or iron naphthanate.

20. A press according to claim 14, wherein the stabilizing agent is iron 2-ethylhexanoate, iron hexogen octoate, or iron naphthanate.

* * * * *